US012726460B2

(12) United States Patent
Banks

(10) Patent No.: US 12,726,460 B2
(45) Date of Patent: Sep. 1, 2026

(54) HARDWARE OFFLOAD OF QUIC DISTRIBUTED DENIAL OF SERVICE PROTECTION

(71) Applicant: Microsoft Technology Licensing, LLC, Redmond, WA (US)

(72) Inventor: Nicholas Aaron Banks, Apex, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 18/472,566

(22) Filed: Sep. 22, 2023

(65) Prior Publication Data

US 2025/0039132 A1 Jan. 30, 2025

Related U.S. Application Data

(60) Provisional application No. 63/515,475, filed on Jul. 25, 2023.

(51) Int. Cl.
*H04L 9/40* (2022.01)
*H04L 47/193* (2022.01)
*H04L 47/32* (2022.01)

(52) U.S. Cl.
CPC ........ *H04L 63/0236* (2013.01); *H04L 47/193* (2013.01); *H04L 47/32* (2013.01); *H04L 63/1458* (2013.01)

(58) Field of Classification Search
CPC combination set(s) only.
See application file for complete search history.

(56) References Cited

U.S. PATENT DOCUMENTS 10,735,378 B1 * 8/2020 Bosco ................. H04L 63/0245
2002/0062333 A1 * 5/2002 Anand ................ H04L 63/1458 718/105
2006/0174324 A1 * 8/2006 Zur ..................... H04L 63/1416 726/3

(Continued)

OTHER PUBLICATIONS

International Search Report and Written Opinion received for PCT Application No. PCT/US2024/036844, mailed on Oct. 10, 2024, 15 pages.

(Continued)

*Primary Examiner* — Abdulkader M Alriyashi
(74) *Attorney, Agent, or Firm* — Workman Nydegger

(57) ABSTRACT

A network interface controller device identifies a CID (connection identifier) within a QUIC packet received at network interface hardware. The network interface controller device determines whether the CID is present in a set of CIDs stored at the network interface controller device. Each CID in the set of CIDs has previously been communicated to the network interface controller device by a QUIC server that executes external to the network interface controller device. If the CID is present in the set of CIDs, the network interface controller device passes the QUIC packet to the QUIC server. Otherwise, if the CID is not present in the set of CIDs, the network interface controller device generates a QUIC stateless reset packet targeted at a source address identified from the QUIC packet, initiates communication of the QUIC stateless reset packet at the network interface hardware and discards the QUIC packet.

19 Claims, 5 Drawing Sheets

(56) References Cited

U.S. PATENT DOCUMENTS

| | | | | |
|---|---|---|---|---|
| 2008/0175246 | A1* | 7/2008 | Kunhappan | H04L 61/5038 370/392 |
| 2010/0131669 | A1* | 5/2010 | Srinivas | G06F 9/452 709/233 |
| 2019/0229903 | A1 | 7/2019 | Balasubramanian et al. | |
| 2020/0344164 | A1 | 10/2020 | Zhang | |
| 2020/0403919 | A1* | 12/2020 | Cui | H04L 69/164 |
| 2021/0099482 | A1 | 4/2021 | Doron | |
| 2023/0146254 | A1* | 5/2023 | Boucadair | H04L 63/1425 726/22 |

OTHER PUBLICATIONS

U.S. Appl. No. 63/515,475, filed Jul. 25, 2023.

International Preliminary Report on Patentability (Chapter I) received for PCT Application No. PCT/US2024/036844, Mailed on Feb. 5, 2026, 09 Pages.

* cited by examiner

Figure 1:
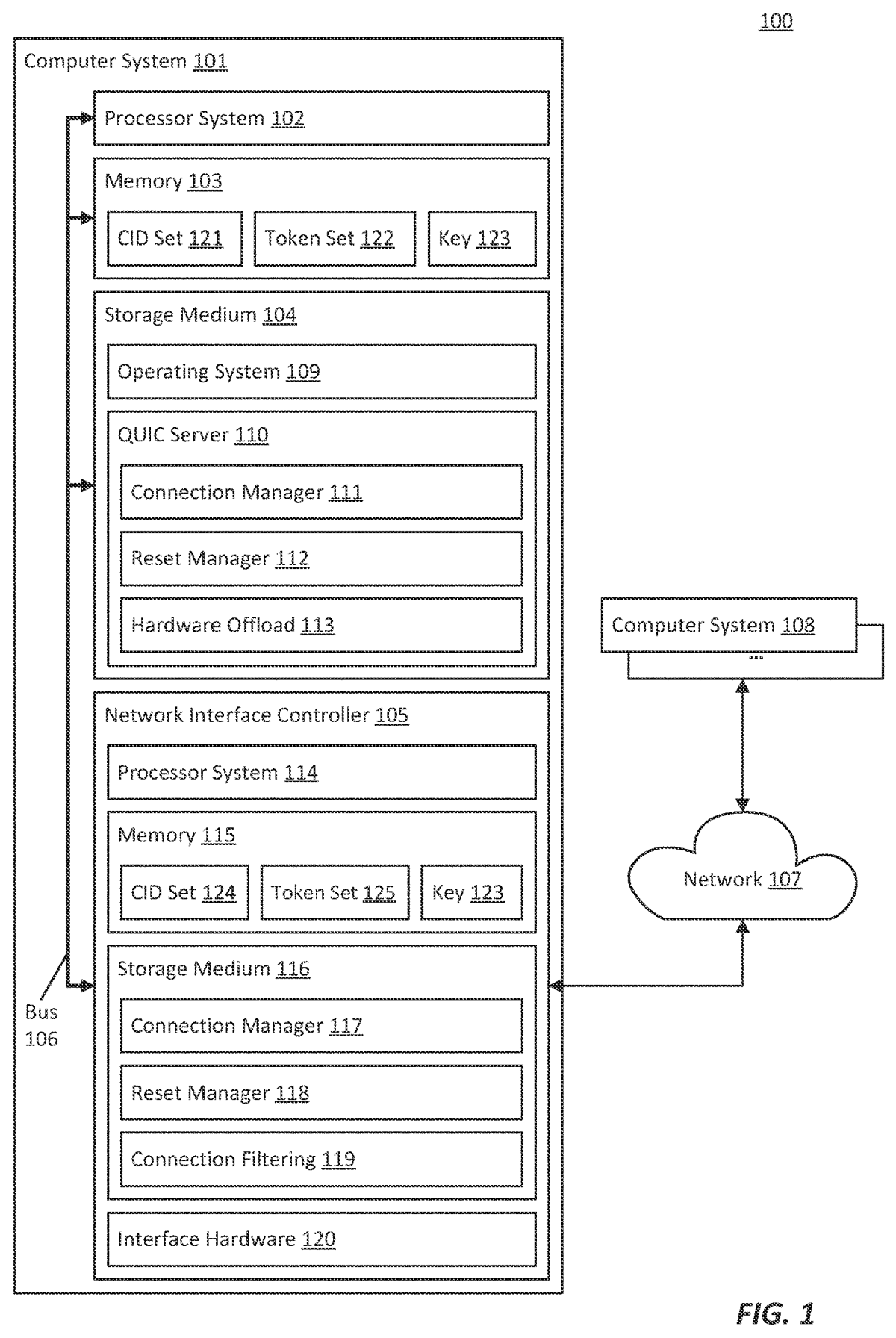

100

Computer System 101
Processor System 102
Memory 103
CID Set 121
Token Set 122
Key 123
Storage Medium 104
Operating System 109
QUIC Server 110
Connection Manager 111
Reset Manager 112
Hardware Offload 113
Network Interface Controller 105
Processor System 114
Memory 115
CID Set 124
Token Set 125
Key 123
Storage Medium 116
Connection Manager 117
Reset Manager 118
Connection Filtering 119
Interface Hardware 120
Bus 106
Computer System 108
...
Network 107

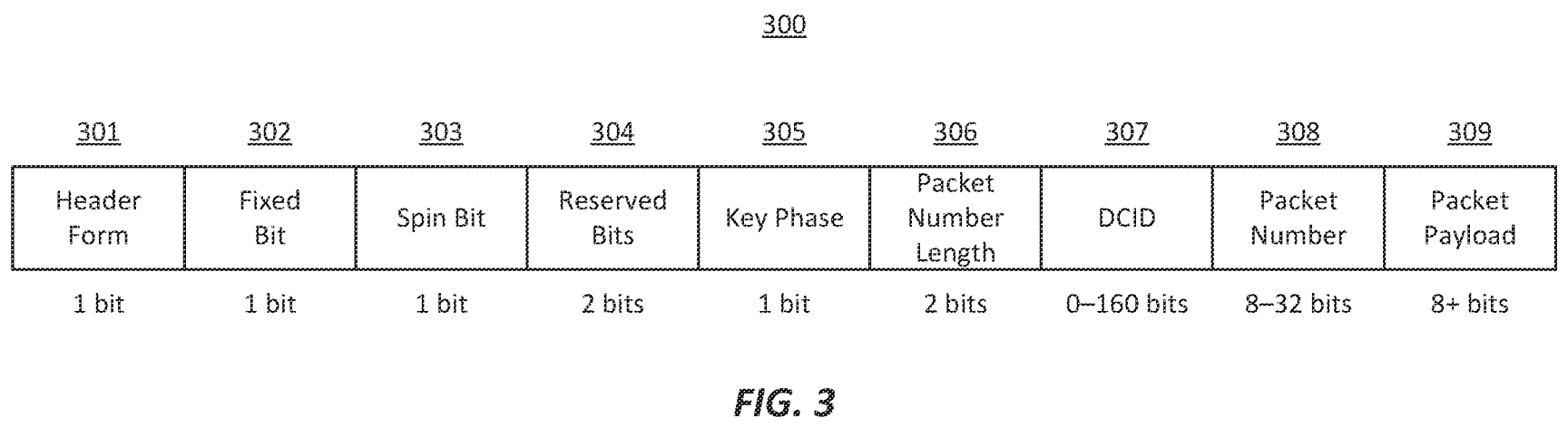

| 301 | 302 | 303 | 304 | 305 | 306 | 307 | 308 | 309 |
|---|---|---|---|---|---|---|---|---|
| Header Form | Fixed Bit | Spin Bit | Reserved Bits | Key Phase | Packet Number Length | DCID | Packet Number | Packet Payload |
| 1 bit | 1 bit | 1 bit | 2 bits | 1 bit | 2 bits | 0–160 bits | 8–32 bits | 8+ bits |

FIG. 3

HARDWARE OFFLOAD OF QUIC DISTRIBUTED DENIAL OF SERVICE PROTECTION

CROSS-REFERENCE TO RELATED APPLICATIONS

This application claims priority to, and the benefit of, U.S. Provisional Patent Application Ser. No. 63/515,475, filed Jul. 25, 2023, and entitled "HARDWARE OFFLOAD OF QUIC DISTRIBUTED DENIAL OF SERVICE PROTECTION," the contents of which are incorporated by reference herein in their entirety.

BACKGROUND

In recent years, there has been a significant increase in the demand for faster, more efficient, and secure communication over the Internet. Traditional protocols such as TCP (Transmission Control Protocol) have been widely used for data transmission. These protocols are not optimized for the requirements of modern web applications, which often involve real-time streaming, low-latency communication, and high throughput. For example, being a reliable protocol, TCP requires multiple round trips (e.g., handshakes) between the client and server to establish a secure connection, which increases latency and slows data transmission. Additionally, in scenarios where packet loss occurs, TCP relies on retransmission, further delaying data delivery.

As a potential solution to these challenges, the QUIC protocol was developed to provide low latency and reliable data transfer over the Internet. It is a transport layer protocol built on top of UDP (User Datagram Protocol), a lightweight and connectionless protocol. Thus, the term "QUIC" was originally proposed as an acronym for "Quick UDP Internet Connections," though the Internet Engineering Task Force's use of the term is not an acronym; rather, it is the name of the protocol. The QUIC protocol introduces several features that differentiate it from traditional protocols. One feature is QUIC's ability to establish a secure connection from the beginning, eliminating the need for additional handshake rounds. This is achieved by integrating encryption and authentication mechanisms within the QUIC protocol itself, enhancing security and reducing the time required to establish a connection. Another feature is QUIC's ability to multiplex multiple data streams within a single QUIC connection. This allows for concurrent data transmission, enabling faster and more efficient communication. Furthermore, QUIC includes congestion control and loss recovery, enhancing its reliability and robustness in adverse network conditions.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products in which a network interface controller device performs operations, including: identifying a CID (connection identifier) within a QUIC packet received at the network interface hardware of the network interface controller device; determining that the CID is present in a set of CIDs stored at the network interface controller device, each CID in the set of CIDs having been communicated to the network interface controller device by a QUIC server that executes external to the network interface controller device; and passing the QUIC packet to the QUIC server based on the CID being present in the set of CIDs.

In some aspects, the techniques described herein relate to methods, systems, and computer program products in which a QUIC server operating in a computer system that includes a processor system performs operations, including: sending, to a network interface controller device, a key for generating a QUIC stateless reset packet; sending, to the network interface controller device, a first indication that a first CID is allowed, based on the first CID being associated with a first QUIC connection established by the QUIC server; and after sending the first indication to the network interface controller device, performing at least one of: sending, to the network interface controller device, a second indication that a second CID replaces the first CID and is allowed; sending, to the network interface controller device, a third indication that the first CID is no longer allowed; and sending, to the network interface controller device, a fourth indication that a third CID is allowed.

In some aspects, the techniques described herein relate to methods, systems, and computer program products in which a computer system performs first operations, including: sending, to a network interface controller device, a key for generating a stateless reset token; and sending, to the network interface controller device, a first indication that a first CID is allowed, based on the first CID being associated with a first QUIC connection established by a QUIC server operating at the first processor system. In some aspects, the techniques described herein also relate to methods, systems, and computer program products in which a network interface controller device performs second operations, including: adding the first CID to a set of CIDs stored at the network interface controller device; identifying a second CID within a QUIC packet received at the network interface hardware; determining that the second CID is not present in the set of CIDs; generating a QUIC stateless reset packet targeted at a source address identified from the QUIC packet, the QUIC stateless reset packet including the stateless reset token; initiating communication of the QUIC stateless reset packet at the network interface hardware; and discarding the QUIC packet.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 1 illustrates an example of a computer architecture that facilitates the offload of QUIC DDoS (Distributed Denial of Service) protection to a network interface controller device;

FIG. 3 illustrates examples of a short header QUIC packet;

DETAILED DESCRIPTION

Figure 2:
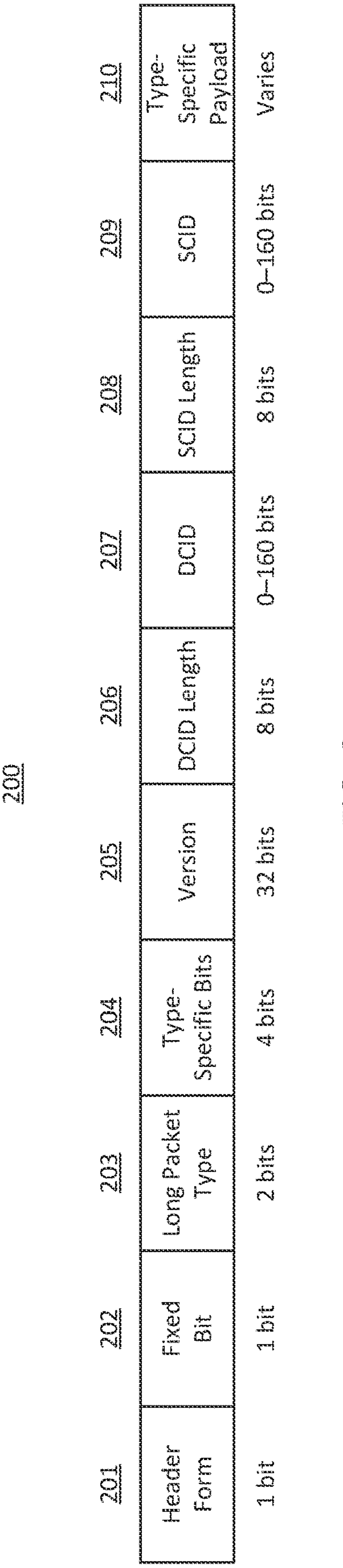
FIG. 2 illustrates examples of a long header QUIC packet.

While providing several advantages over conventional data transmission protocols, such as TCP (Transmission Control Protocol), there remain some challenges with managing a server that implements the QUIC protocol. One such challenge is protecting a QUIC server against a DDoS (Distributed Denial of Service) attack. In a DDoS attack, a malicious party attempts to disrupt the normal functioning of a network or server by overwhelming it with a flood of network packets (e.g., using computers that the malicious party has compromised using malware), rendering the network or server inaccessible to legitimate users. DDoS protection is conventionally implemented in an intermediate computer system, such as a firewall or a load balancer, that is positioned between a server and the clients connecting to it. The intermediate computer system maintains a list of valid TCP connections as a set of tuples, such as a set of 4-tuples that each comprises a source IP (internet protocol) address (e.g., client IP address), a source port, a destination IP address (e.g., server IP address), and a destination port. The intermediate computer system uses this set of tuples to forward a legitimate packet to an appropriate server (e.g., when the packet matches a tuple in the set and thus corresponds to an established TCP connection) or to drop an illegitimate packet (e.g., when the packet does not match a tuple in the set).

One feature of the QUIC protocol is that a single peer of a QUIC server (e.g., a client in a client/server peer grouping) may be associated with different IP addresses. For example, a QUIC connection can survive a client's transition from a Wi-Fi network connection (and a first IP address associated therewith) to a cellular network connection (and a different second IP address associated therewith). In another example, a QUIC connection can survive a client's IP address changing due to a NAT (Network Address Translation) service timing out an underlying UDP flow. Due to these attributes, a valid QUIC connection cannot readily be identified by a 4-tuple (e.g., source IP address, source port, destination IP address, destination port) as is the case for TCP connections. As such, there are challenges with implementing DDoS protection for QUIC connections at intermediate computer systems, such as firewalls and load balancers.

Due to the challenges with implementing DDoS protection for QUIC connections at intermediate computer systems, DDoS protection is generally implemented at QUIC servers. Under the QUIC protocol, when establishing a QUIC connection, each peer assigns one or more CIDs (connection identifiers) to the QUIC connection and communicates the CID(s) to the other peer. A QUIC server maintains a list of CIDs that it has assigned to active established QUIC connections and uses this list to determine if received QUIC packets are legitimate or not (e.g., by determining if a destination CID in a received QUIC packet matches a CID on the list). The QUIC server then processes legitimate QUIC packets and rejects illegitimate QUIC packets (e.g., by dropping the QUIC packet and returning a stateless reset packet to the sender).

Notably, a QUIC packet traverses from networking hardware, through an OS networking stack, and to the QUIC server before the QUIC server can determine whether the QUIC packet is legitimate. This transit process consumes computing resources (e.g., processor time, memory) for each packet. Additionally, the QUIC server's QUIC packet legitimacy determination, and potential QUIC packet rejection, consume further computing resources. When receiving a barrage of seemingly random QUIC packets (random source IP addresses, random QUIC CIDs), as can be the case with DDoS attacks, the computing resources consumed by the transits and/or the legitimacy determinations for these QUIC packets can be so expensive as to prevent the QUIC server from doing any other useful work.

At least some embodiments described herein address these challenges by offloading QUIC DDoS protection to a network interface controller device. In particular, a QUIC server implemented per the embodiments described herein offloads a set of allowable QUIC CIDs to a network interface controller. A network interface controller implemented per the embodiments described herein then compares the CID of each incoming short header QUIC packet to the offloaded set of allowable QUIC CIDs. If the CID is in the set, the network interface controller processes the QUIC packet as usual (e.g., by communicating it to the QUIC server via an OS network stack). If not, the network interface controller drops the QUIC packet.

In some embodiments, the QUIC server also communicates a key to the network interface controller, which enables the network interface controller to generate stateless reset tokens for integration into QUIC stateless reset packets. Then, when the network interface controller drops a QUIC packet, it also uses this key to return a QUIC stateless reset packet to the sender. In some embodiments, the network interface controller throttles the sending of QUIC stateless reset packets, such as by returning QUIC stateless reset packets for only a subset of QUIC packets associated with a given non-allowed CID.

FIG. 1 illustrates an example of a computer architecture 100 that facilitates the offload of QUIC DDoS protection to a network interface controller device. As shown, computer architecture 100 includes a computer system 101 comprising a processor system 102 (e.g., a single processor or a plurality of processors), a memory 103 (e.g., system or main memory), a storage medium 104 (e.g., a single computer-readable storage medium or a plurality of computer-readable storage media), and a network interface controller 105, all interconnected by a bus 106. As shown, network interface controller 105 interconnects, via a network 107, to computer system 108 (e.g., a single computer system or, more typically, a plurality of computer systems).

FIG. 1 illustrates the storage medium 104 as storing computer-executable instructions implementing at least an OS 109 (operating system) and a QUIC server 110. Notably, OS 109 and QUIC server 110 are illustrated as being separate. However, in some embodiments, QUIC server 110 is a component of OS 109. In embodiments, QUIC server 110 uses the QUIC protocol to provide one or more services to QUIC clients, such as computer system 108. Example services include HTTP (Hypertext Transfer Protocol) services, DNS (Domain Name System) services, and secure tunneling services.

While a conventional QUIC server handles protection against DDoS attacks directly, potentially leading to excessive computing resource consumption and poor performance, in embodiments, QUIC server 110 offloads QUIC DDoS protection to network interface controller 105. This avoids the transit of illegitimate QUIC packets over a network stack (e.g., a component of OS 109) and enables QUIC server 110 to focus on processing legitimate QUIC packets.

To describe QUIC DDoS protection offload functionality, FIG. 1 illustrates QUIC server 110 as including a connection manager component 111, a reset manager component 112, and a hardware offload component 113. Each component illustrated as part of QUIC server 110 represents various functionality that QUIC server 110 may implement under the embodiments described herein. However, these components are presented merely as an aid in describing example embodiments of QUIC server 110.

In embodiments, connection manager component 111 manages QUIC connections between QUIC server 110 and peers, such as computer system 108. To manage these QUIC connections, connection manager component 111 generates unique server-assigned CIDs for each QUIC connection. Connection manager component 111 also maintains a CID set 121 comprising the server-assigned CIDs of the active QUIC connections. While illustrated as being resident within memory 103, CID set 121 could additionally, or alternatively, be stored in storage medium 104. In embodiments, each server-assigned CID in CID set 121 is associated with additional state information, such as an associated source QUIC port, an associated destination QUIC port, a local IP address, a peer IP address, a peer-assigned CID, and the like.

Notably, the QUIC protocol permits a CID associated with a QUIC connection to be changed during the life of the connection. Thus, in embodiments, connection manager component 111 can generate a new server-side CID for a given QUIC connection and update that connection's server-side CID within CID set 121. For example, in embodiments, part of the information encapsulated by a server-side CID is which processing unit within processor system 102 at which a corresponding QUIC connection is being processed. In these embodiments, if that processing unit changes, connection manager component 111 generates a new server-side CID and updates the CID set 121.

In embodiments, reset manager component 112 manages information used to cancel each QUIC connection (e.g., by sending a stateless reset packet comprising a stateless reset token to the QUIC connection's peer). In particular, reset manager component 112 utilizes a key 123 to generate a unique QUIC stateless reset token for each QUIC connection. Reset manager component 112 also maintains a token set 122 comprising the QUIC stateless reset tokens for the active QUIC connections. Although illustrated as separate from CID set 121, in embodiments, the information contained in token set 122 is part of the same data structure as CID set 121. In some embodiments, reset manager component 112 generates key 123 (e.g., each time QUIC server 110 is initialized). In other embodiments, reset manager component 112 loads key 123 from persistent storage (e.g., storage medium 104).

In embodiments, hardware offload component 113 offloads information about active QUIC connections to network interface controller 105, enabling network interface controller 105 to handle DDoS protection on behalf of QUIC server 110. In embodiments, hardware offload component 113 communicates this information to network interface controller 105 using a hardware interface defined by network interface controller 105. For example, the hardware interface may define messages to be communicated over bus 106 to network interface controller 105, and/or may define memory locations for communicating with network interface controller 105 via direct memory access, etc.

In embodiments, hardware offload component 113 communicates CID set 121 or a portion thereof to network interface controller 105 (e.g., illustrated as CID set 124 at network interface controller 105). In embodiments, when QUIC server 110 establishes a QUIC connection, hardware offload component 113 communicates the server-assigned CID for that connection to network interface controller 105. In embodiments, when QUIC server 110 modifies a QUIC connection's server-assigned CID, hardware offload component 113 communicates the modified CID for that QUIC connection to network interface controller 105. In embodiments, when QUIC server 110 cancels a QUIC connection, hardware offload component 113 communicates the removal of that QUIC connection's CID to network interface controller 105.

In some embodiments, hardware offload component 113 also sends other relevant information about QUIC connections (e.g., source and destination QUIC ports, local IP address, peer IP address, peer-assigned CID) to network interface controller 105.

In embodiments, hardware offload component 113 also communicates key 123 to network interface controller 105, which enables network interface controller 105 to generate QUIC stateless reset tokens for inclusion in QUIC stateless reset packets.

As shown, network interface controller 105 also comprises a processor system 114 (e.g., a single processor or a plurality of processors), a memory 115, a storage medium 116 (e.g., a single computer-readable storage medium or a plurality of computer-readable storage media), and network interface hardware 120 (e.g., Ethernet, Fibre Channel, Wi-Fi radio). FIG. 1 illustrates the storage medium 116 as storing computer-executable instructions implementing at least a connection manager component 117, a reset manager component 118, and a connection filtering component 119. Each component illustrated as part of network interface controller 105 represents various functionality that network interface controller 105 may implement under the embodiments described herein. However, these components are presented merely as an aid in describing example embodiments of network interface controller 105.

In embodiments, based on communications received from hardware offload component 113, connection manager component 117 maintains a CID set 124, comprising allowed server-side CIDs. In embodiments, based on hardware offload component 113 communicating a new server-assigned CID for a QUIC connection to network interface controller 105 (e.g., based on QUIC server 110 establishing a new QUIC connection), connection manager component 117 adds the CID to CID set 124. In embodiments, based on hardware offload component 113 communicating a modified CID for a QUIC connection to network interface controller 105 (e.g., based on QUIC server 110 modifying a connection's server-assigned CID for the QUIC connection), connection manager component 117 updates the CID for that QUIC connection within CID set 124. In embodiments, based on hardware offload component 113 communicating the removal of a CID to network interface controller 105 (e.g., based on QUIC server 110 canceling a QUIC connection), connection manager component 117 removes that CID from CID set 124.

In some embodiments, connection manager component 117 also receives other information about QUIC connections from hardware offload component 113 (e.g., source and destination QUIC ports, local IP address, peer IP address, a peer-assigned CID) and associates that information with the CIDs within CID set 124.

In embodiments, reset manager component 118 uses key 123 (e.g., received from hardware offload component 113) to generate QUIC stateless reset tokens for inclusion in QUIC stateless reset packets. In some embodiments, reset manager component 118 persists these QUIC stateless reset tokens as token set 125.

In embodiments, connection filtering component 119 handles DDoS protection against incoming QUIC packets based on information (e.g., CID set 124, key 123) offloaded to network interface controller 105 by hardware offload component 113. In embodiments, when a QUIC packet arrives at network interface hardware 120, connection filtering component 119 determines if a CID in a header of that QUIC packet matches a CID within CID set 124. If so, connection filtering component 119 communicates the QUIC packet to QUIC server 110 (e.g., based on passing the QUIC packet to an OS network stack).

Alternatively, if the CID in the header of the QUIC packet does not match a CID within CID set 124, connection filtering component 119 prevents communication of the QUIC packet to QUIC server 110. In embodiments, connection filtering component 119 drops the QUIC packet. In some embodiments, connection filtering component 119 also returns a QUIC stateless reset packet to the sender of the QUIC packet, based on reset manager component 118 using key 123 to generate a QUIC stateless reset token. In embodiments, connection filtering component 119 rate-limits the sending of QUIC stateless reset packets for a given CID. For example, connection filtering component 119 records state associated with the QUIC packet's CID (e.g., within memory 115). Then, based on that state, connection filtering component 119 avoids sending a QUIC stateless reset packet for a subsequently received QUIC packet that contains the CID.

The QUIC protocol defines both long header QUIC packets (long header packets) and short header QUIC packets (short header packets). Long header packets are generally used for establishing or updating a QUIC connection, while short header packets are used during typical data transmission. In embodiments, connection filtering component 119 only filters short header packets. Filtering only short header packets while permitting long header packets enables the establishment of new QUIC connections by QUIC server 110.

FIG. 2 illustrates an example 200 of a long header packet, according to the QUIC specification, RFC (request for comments) 9000. In example 200, the long header packet includes a Header Form 201 (one bit), which is set to one for long header packets. The long header packet also includes a Fixed Bit 202 (one bit), which is set to one to allow QUIC to coexist with other protocols. The long header packet also includes a Long Packet Type 203 (two bits) that specifies a packet type, as shown in Table 1:

TABLE 1

| Type | Name |
|---|---|
| 0x00 | Initial |
| 0x01 | 0-RTT |
| 0x02 | Handshake |
| 0x03 | Retry |

The long header packet also includes Type-Specific Bits 204 (four bits), the semantics of which are determined by the packet type. The long header packet also includes a Version 205 (32-bits) that indicates the version of QUIC that is in use, and which determines how the rest of the protocol fields are interpreted. The long header packet also includes a Destination CID Length 206 (eight bits) that contains the length in bytes of the destination CID that follows it. The long header packet also includes a Destination CID 207 (zero to 160-bits) that contains a destination CID. The destination CID is chosen by the recipient of the packet and is used to provide consistent routing. The long header packet also includes a Source CID Length 208 (eight bits) that contains the length in bytes of the source CID that follows it. The long header packet also includes a Source CID 209 (zero to 160-bits) that contains a source CID. The source CID is used to set the destination CID used by the peer. The long header packet may also include a Type-Specific Payload 210 of varying size; thus, the remainder of the packet, if any, is type specific.

FIG. 3 illustrates an example 300 of a short header QUIC packet, according to the QUIC specification. In example 300, the short header packet includes a Header Form 301 (one bit), which is set to zero for short header packets. The short header packet also includes a Fixed Bit 302 (one bit), which is set to one to allow QUIC to coexist with other protocols. The short header packet also includes a Spin Bit 303 (one bit), a latency spin bit that enables passive latency monitoring from observation points on a network path throughout the duration of a connection. The short header packet also includes Reserved Bits 304 (two bits). The short header packet also includes a Key Phase 305 (one bit), which allows a recipient of a packet to identify packet protection key(s) that are used to protect the packet. The short header packet also includes a Packet Number Length 306 (two bits), which contains the length of a Packet Number. The short header packet also includes a Destination CID 307 (zero to 160-bits) that contains a destination CID, which is chosen by the intended recipient of the packet. The short header packet also includes a Packet Number 308 (eight to 32 bits) that stores a packet number for the packet. The short header packet includes a Packet Payload 309 (eight or more bits).

Figure 4:
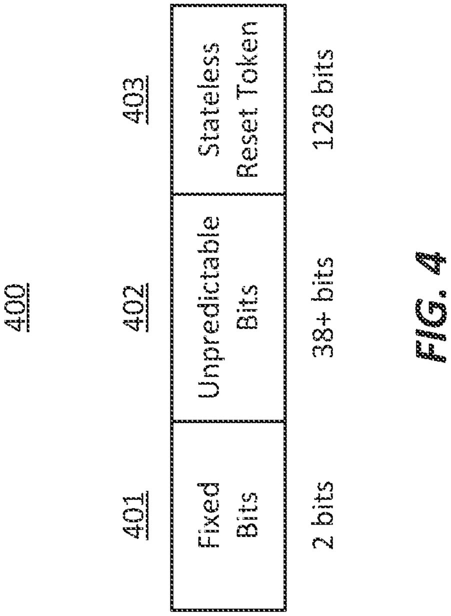
FIG. 4 illustrates an example of a QUIC stateless reset packet.

FIG. 4 illustrates an example 400 of a QUIC stateless reset packet, according to the QUIC specification. The QUIC specification defines the stateless reset, to the extent possible, to be indistinguishable from a short header QUIC packet. A stateless reset packet uses an entire UDP datagram, starting with the first two bits of the packet header. Thus, in example 400, the QUIC stateless reset packet includes Fixed Bits 401 (two bits). The remainder of the first byte and an arbitrary number of bytes following it are set to values that, per the specification, should be indistinguishable from random. Thus, in example 400, the QUIC stateless reset packet includes Unpredictable Bits 402 (38 or more bits). The last 16 bytes of the datagram contain a stateless reset token. Thus, in example 400, the QUIC stateless reset packet includes Stateless Reset Token 403 (128-bits).

Notably, in some implementations, the amount of storage space (e.g., memory 115) within network interface controller 105 may be relatively limited compared to the amount of storage space (e.g., memory 103) within computer system 101. As a result, network interface controller 105 may support fewer active QUIC connections than QUIC server 110 could support (e.g., if QUIC server 110 wasn't offloading DDoS protection for QUIC connections to network interface controller 105). For example, network interface controller 105 may be more limited in the number of CIDs it can manage within CID set 124 than QUIC server 110 can manage within CID set 121. In embodiments, hardware offload component 113 queries network interface controller 105 for information indicative of a first number of active QUIC connections that network interface controller 105 can support, and then QUIC server 110 limits a second number of active QUIC connections it creates to be less than the first number. In embodiments, information indicative of the number of active QUIC connections that network interface controller 105 can support comprises a size of memory 115, or how many CIDs the network interface controller device has the capacity to store within CID set 124.

Embodiments are now described in connection with FIG. 5, which illustrates flow charts of an example method 500*a* for offloading allowed QUIC CIDs to a network interface controller device for DDoS protection and an example method 500*b* for QUIC DDoS protection in a network interface controller device (collectively, a method 500 for hardware offload of QUIC DDoS protection). In some embodiments, method 500*a* and method 500*b* are distinct methods (e.g., one implemented by processor system 102 and another implemented by processor system 114), while in other embodiments, method 500*a* and method 500*b* are part of a single method (e.g., implemented by computer system 101).

In embodiments, instructions for implementing method 500*a* are encoded as computer-executable instructions (e.g., QUIC server 110) stored on a computer storage medium (e.g., storage medium 104) that are executable by a processor (e.g., processor system 102) to cause a computer system (e.g., computer system 101) to perform method 500*a*. In embodiments, instructions for implementing method 500*b* are encoded as computer-executable instructions (e.g., connection manager component 117, reset manager component 118, connection filtering component 119) stored on a computer storage medium (e.g., storage medium 116) that are executable by a processor (e.g., processor system 114) to cause a computer system (e.g., network interface controller 105) to perform method 500*b*.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Figure 5:
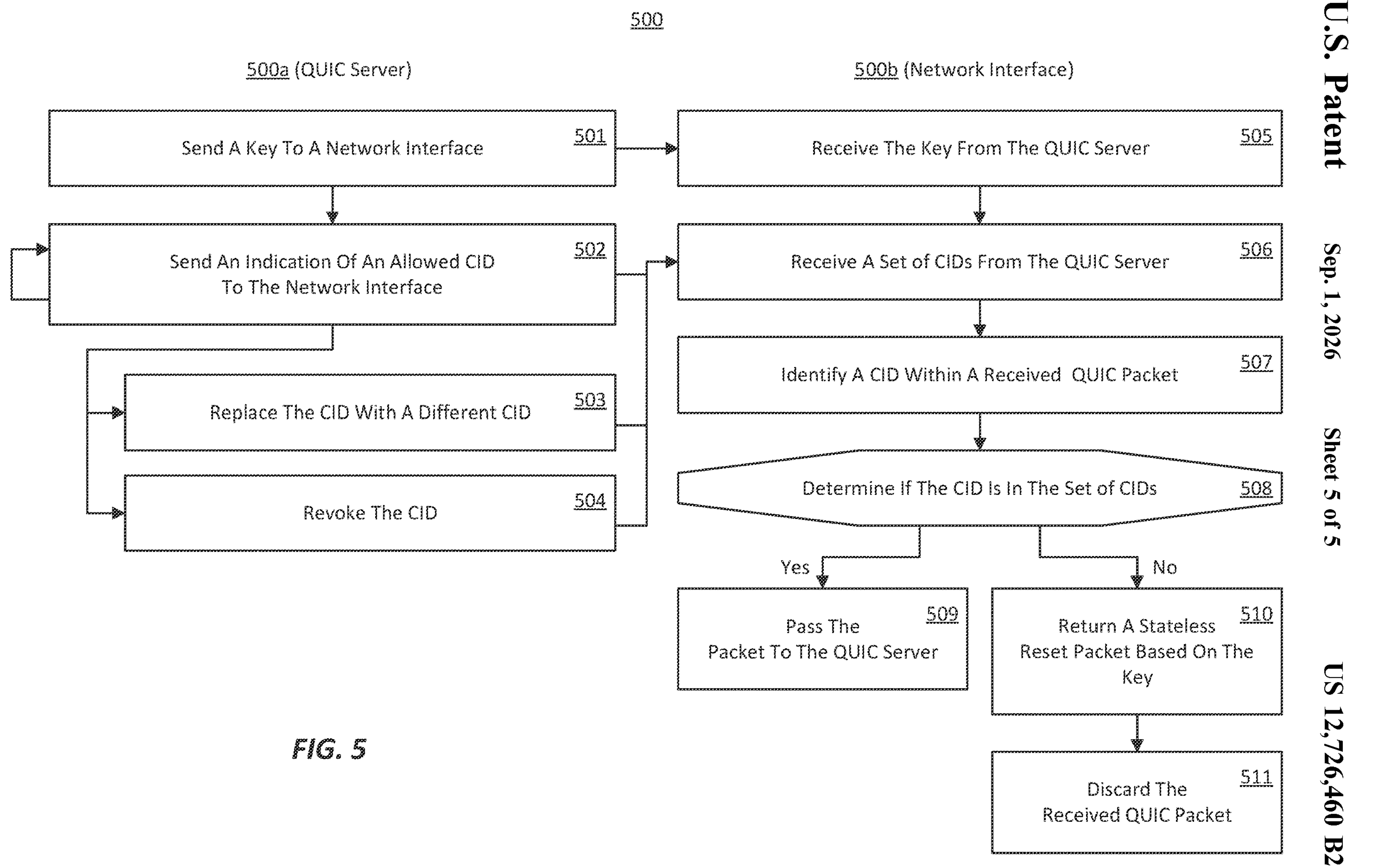
FIG. 5 illustrates a flow chart of an example of a method for hardware offload of QUIC DDoS protection.

As indicated in FIG. 5, method 500*a* is performed by a QUIC server, such as QUIC server 110, executing at processor system 102. In embodiments, method 500*a* comprises act 501 of sending reset information to a network interface controller device. In some embodiments, act 501 comprises sending a key for generating a QUIC stateless reset packet to a network interface controller device. For example, hardware offload component 113 sends key 123 to network interface controller 105.

Method 500*a* also comprises act 502 of sending an indication of an allowed CID to the network interface controller device. In some embodiments, act 502 comprises sending, to the network interface controller device, a first indication that a first CID is allowed, based on the first CID being associated with a first QUIC connection established by the QUIC server. For example, when QUIC server 110 establishes a new QUIC connection, hardware offload component 113 indicates a new server-assigned CID for the connection to network interface controller 105. In embodiments, performance of act 502 is based on receiving, from the network interface controller device, a QUIC packet comprising the first CID.

After act 502, method 500*a* may comprise act 503 of replacing the CID with a different CID. In some embodiments, act 503 comprises, after sending the first indication to the network interface controller device, sending the network interface controller device a second indication that a second CID replaces the first CID and is allowed. For example, based on connection manager component 111 updating the server-assigned CID for an existing QUIC connection (e.g., based on changing an attribute of the first QUIC connection, such as a processing unit associated with the first QUIC connection), hardware offload component 113 sends this updated CID to network interface controller 105.

Alternatively, after act 502, method 500*a* may comprise act 504 of revoking the CID. In some embodiments, act 504 comprises, after sending the first indication to the network interface controller device, sending the network interface controller device a third indication that the first CID is no longer allowed. For example, based on connection manager component 111 terminating an existing QUIC connection, hardware offload component 113 indicates a removal of the connection's CID to network interface controller 105.

As indicated by an arrow looping from act 502 back into act 502, in embodiments, act 502 repeats for each newly established QUIC connection. For each instance of act 502, there can also be an instance of act 503 or act 504 (e.g., to modify or remove the CID for the QUIC connection). Thus, for example, some embodiments of method 500*a* include, after sending the first indication to the network interface controller device, sending the network interface controller device a fourth indication that a third CID is allowed.

In some embodiments, method 500*a* also comprises receiving, from the network interface controller device, information indicative of a number of CIDs the network interface controller device has the capacity to store and defining a maximum number of QUIC connections supported by the QUIC server that does not exceed the number of CIDs that the network interface controller device has the capacity to store.

Turning to method 500*b*, as indicated in FIG. 5, method 500*b* is performed at a network interface, such as network interface controller 105. In embodiments, method 500*b* comprises act 505 of receiving the key from the QUIC server. For example, based on the performance of act 501 by QUIC server 110, network interface controller 105 receives key 123, and reset manager component 118 stores the key 123 within memory 115. In embodiments, method 500*b* comprises network interface controller 105 generating a stateless reset token based on the key.

Method 500*b* also comprises act 506 of receiving a set of CIDs from the QUIC server. In some embodiments, act 506 comprises receiving a CID communicated to the network interface controller device by the QUIC server and indicated as being added as an allowable CID and inserting the CID into the set of CIDs. For example, based on the performance of act 502 by QUIC server 110, network interface controller 105 receives a CID, and connection manager component 117 inserts that CID into CID set 124.

As discussed, in embodiments, act 502 repeats for each newly established QUIC connection, and there can also be an instance of act 503 or act 504 for each instance of act 502. Thus, in embodiments, act 506 includes receiving a set of a plurality of allowed CIDs from the QUIC server over time, with each CID in the set of CIDs having been communicated to the network interface controller device by a QUIC server that executes external to the network interface controller device.

In some embodiments, act 506 includes receiving a CID communicated to the network interface controller device by the QUIC server and indicated as being added as an allowable CID and inserting that CID into the set of CIDs. In some embodiments, act 506 includes receiving a first CID communicated to the network interface controller device by the QUIC server and indicated as replacing a second CID as an allowable CID and replacing the second CID with the first CID in the set of CIDs. In some embodiments, act 506 includes receiving a CID communicated to the network interface controller device by the QUIC server and indicated as no longer allowable and removing that CID from the set of CIDs.

Notably, while act 505 and act 506 are illustrated as occurring in a particular serial order, they could alternatively be performed in reverse order, or in parallel.

Method 500*b* also comprises act 507 of identifying a CID within a received QUIC packet. In some embodiments, act 507 comprises identifying a CID within a QUIC packet received at the network interface hardware. For example, based on receiving a QUIC packet at network interface hardware 120 (e.g., from computer system 108), connection filtering component 119 identifies a destination CID within a header of that QUIC packet.

In some embodiments, act 507 only operates on short header QUIC packets, such as the short header packet described in connection with example 300. Thus, in embodiments, the QUIC packet is a short header packet. In these embodiments, long header QUIC packets (e.g., the long header packet of example 200) are communicated to QUIC server 110 without filtering.

Method 500*b* also comprises act 508 of determining if the CID is in the set of CIDs. In some embodiments, act 508 comprises determining whether the CID is present in the set of CIDs stored at the network interface controller device. For example, connection filtering component 119 determines if the identified CID exists within CID set 124.

When the outcome of act 508 is a determination that the CID is in the set of CIDs (e.g., 'Yes' from act 508), method 500*b* comprises act 509 of passing the packet to the QUIC server. In some embodiments, act 509 comprises passing the QUIC packet to the QUIC server based on the CID being present in the set of CIDs. For example, connection filtering component 119 passes the QUIC packet to a network stack (e.g., OS 109).

Alternatively, when the outcome of act 508 is a determination that the CID is not in the set of CIDs (e.g., 'No' from act 508), in some embodiments, method 500*b* comprises act 510 of returning a stateless reset packet based on the reset information. In some embodiments, act 510 comprises generating a QUIC stateless reset packet targeted at a source address identified from the QUIC packet, the QUIC stateless reset packet including the stateless reset token; and initiating communication of the QUIC stateless reset packet at the network interface hardware. For example, based on key 123, reset manager component 118 generates a QUIC stateless reset token for the QUIC packet, and connection filtering component 119 uses that QUIC stateless reset token to return a QUIC stateless reset packet to computer system 108 (e.g., by inserting the stateless reset token into the QUIC stateless reset packet).

Notably, to further protect against DDoS attacks, connection filtering component 119 may throttle the sending of QUIC stateless reset packets. Thus, act 510 may only be performed for a subset of received QUIC packets comprising a given CID. In some embodiments, throttling the sending of QUIC stateless reset packets includes recording a state associated with a CID for which a stateless reset packet was returned. Then, when a subsequent QUIC packet is received at the network interface hardware that comprises the CID, connection filtering component 119 identifies the state associated with the CID. Based on identifying this state, connection filtering component 119 refrains from sending an additional QUIC stateless reset packet.

When the outcome of act 508 is a determination that the CID is not in the set of CIDs (e.g., 'No' from act 508), method 500*b* also comprises an act 511 of discarding the received QUIC packet.

Notably, while act 510 and act 511 are illustrated in a particular serial order, they could alternatively be performed in reverse order, or in parallel.

Although not illustrated, in embodiments, method 500*b* also includes communicating, to the QUIC server, information indicative of a number of CIDs that the network interface controller device has a capacity to store in the set of CIDs (e.g., based on a size of memory 115).

Embodiments of the disclosure comprise or utilize a special-purpose computer system (e.g., network interface controller 105) and/or a general-purpose computer system (e.g., computer system 101) that includes computer hardware, such as, for example, a processor system (e.g., processor system 102, processor system 114) and system memory (e.g., memory 103, memory 115), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104, storage medium 116). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM (random access memory), ROM (read-only memory), EEPROM (electrically erasable programmable ROM), SSDs (solid state drives), flash memory, PCM (phase-change memory), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface controller 105) and eventually transferred to computer system RAM and/or less volatile computer storage media at a computer system. Thus, computer storage media can be included in computer system components that also utilize transmission media.

In some examples, computer-executable instructions comprise instructions and data which, when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs (central processing units), one or more GPUs (graphics processing units), one or more NPUs (neural processing units), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network personal computers, minicomputers, mainframe computers, mobile telephones, personal desktop assistants, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Saas (Software as a Service), PaaS (Platform as a Service), IaaS (Infrastructure as a Service), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs (virtual machines). During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A network interface controller device, comprising:

a processor system;

network interface hardware; and a computer storage medium that stores computer-executable instructions that are executable by the processor system to perform operations comprising:

identifying a first_CID (connection identifier) within a first QUIC packet received at the network interface hardware;

determining that the first CID is present in a set of CIDs stored at the network interface controller device, each CID in the set of CIDs having been communicated to the network interface controller device by a QUIC server that executes external to the network interface controller device;

passing the first QUIC packet to the QUIC server based on the first CID being present in the set of CIDs;

identifying a second CID within a second QUIC packet received at the network interface hardware;

determining that the second CID is not present in the set of CIDs;

generating a QUIC stateless reset packet targeted at a source address identified from the second QUIC packet;

initiating communication of the QUIC stateless reset packet at the network interface hardware; and discarding the second QUIC packet.

2. The network interface controller device of claim 1, wherein the first QUIC packet is a short header packet.

3. The network interface controller device of claim 1, wherein the operations further comprise recording a state associated with the second CID.

4. The network interface controller device of claim 3, wherein the QUIC stateless reset packet is a first QUIC stateless reset packet, and wherein the operations further comprise:

identifying the second CID within a third QUIC packet received at the network interface hardware;

identifying the state associated with the second CID; and refraining from sending a second QUIC stateless reset packet based on identifying the state associated with the second CID.

5. The network interface controller device of claim 1, wherein generating the QUIC stateless reset packet comprises inserting a stateless reset token into the QUIC stateless reset packet.

6. The network interface controller device of claim 5, wherein the operations further comprise generating the stateless reset token based on a key communicated to the network interface controller device by the QUIC server.

7. The network interface controller device of claim 1, wherein the operations further comprise:

receiving the first CID communicated to the network interface controller device by the QUIC server and indicated as being added as an allowable CID; and inserting the first CID into the set of CIDs.

8. The network interface controller device of claim 1, wherein the operations further comprise:

receiving the first CID communicated to the network interface controller device by the QUIC server and indicated as replacing a third CID as an allowable CID; and replacing the third CID with the first CID in the set of CIDs.

9. The network interface controller device of claim 1, wherein the operations further comprise:

receiving the first CID communicated to the network interface controller device by the QUIC server and indicated as no longer allowable; and removing the first CID from the set of CIDs.

10. The network interface controller device of claim 1, wherein the operations further comprise communicating, to the QUIC server, information indicative of a number of CIDs that the network interface controller device has a capacity to store in the set of CIDs.

11. A method implemented by a QUIC server operating in a computer system that includes a processor system, comprising:

sending, to a network interface controller device, a key for generating a QUIC stateless reset packet;

sending, to the network interface controller device, a first indication that a first CID (connection identifier) is allowed, based on the first CID being associated with a first QUIC connection established by the QUIC server; and after sending the first indication to the network interface controller device, performing at least one of:

sending, to the network interface controller device, a second indication that a second CID replaces the first CID and is allowed;

sending, to the network interface controller device, a third indication that the first CID is no longer allowed; and sending, to the network interface controller device, a fourth indication that a third CID is allowed.

12. The method of claim 11, wherein the method further comprises receiving, from the network interface controller device, a QUIC packet comprising the first CID.

13. The method of claim 11, wherein the method further comprises:

receiving, from the network interface controller device, information indicative of a number of CIDs the network interface controller device has a capacity to store; and defining a maximum number of QUIC connections supported by the QUIC server that does not exceed the number of CIDs that the network interface controller device has the capacity to store.

14. The method of claim 11, wherein, based on changing an attribute of the first QUIC connection, the method comprises sending the second indication that the second CID replaces the first CID and is allowed.

15. The method of claim 11, wherein, based on the first QUIC connection no longer being established by the QUIC server, the method comprises sending the third indication that the first CID is no longer allowed.

16. The method of claim 11, wherein, based on the third CID being associated with a second QUIC connection established by the QUIC server, the method comprises sending the fourth indication that the third CID is allowed.

17. A computer system, comprising:

a first processor system;

a first computer storage medium that stores first computer-executable instructions that are executable by the first processor system to perform first operations comprising:

sending, to a network interface controller device, a key for generating a stateless reset token; and sending, to the network interface controller device, a first indication that a first CID (connection identifier) is allowed, based on the first CID being associated with a first QUIC connection established by a QUIC server operating at the first processor system; and the network interface controller device, which comprises a second processor system, network interface hardware, and a second computer storage medium that stores second computer-executable instructions that are executable by the second processor system to perform second operations comprising:

adding the first CID to a set of CIDs stored at the network interface controller device;

identifying a second CID within a QUIC packet received at the network interface hardware;

determining that the second CID is not present in the set of CIDs;

generating a QUIC stateless reset packet targeted at a source address identified from the QUIC packet, the QUIC stateless reset packet including the stateless reset token;

initiating communication of the QUIC stateless reset packet at the network interface hardware; and discarding the QUIC packet.

18. The computer system of claim 17, wherein the QUIC packet is a short header packet.

19. The computer system of claim 17, wherein the QUIC packet is a first QUIC packet, and the second operations further comprise:

identifying the first CID within a second QUIC packet received at the network interface hardware;

determining that the first CID is present in the set of CIDs; and passing the second QUIC packet to the QUIC server based on the first CID being present in the set of CIDs.

* * * * *